United States Patent
Qin et al.

(10) Patent No.: US 7,890,993 B2
(45) Date of Patent: Feb. 15, 2011

(54) SECRET FILE ACCESS AUTHORIZATION SYSTEM WITH FINGERPRINT LIMITATION

(75) Inventors: Yunchuan Qin, Shanghai (CN); Jungang Zhou, Shanghai (CN)

(73) Assignee: Shanghai Sanlen Info Security Co., Ltd., Shanghai (CN)

( * ) Notice: Subject to any disclaimer, the term of this patent is extended or adjusted under 35 U.S.C. 154(b) by 727 days.

(21) Appl. No.: 10/594,299

(22) PCT Filed: Mar. 24, 2005

(86) PCT No.: PCT/CN2005/000368
§ 371 (c)(1),
(2), (4) Date: Sep. 26, 2006

(87) PCT Pub. No.: WO2005/093581
PCT Pub. Date: Oct. 6, 2005

(65) Prior Publication Data
US 2007/0209064 A1  Sep. 6, 2007

(30) Foreign Application Priority Data
Mar. 26, 2004  (CN) .................. 2004 1 0017241

(51) Int. Cl.
*G06F 7/04* (2006.01)
*H04L 9/32* (2006.01)
*H04L 9/00* (2006.01)

(52) U.S. Cl. .............. 726/5; 726/3; 726/4; 726/6; 726/7; 726/8; 713/155; 713/156; 713/157; 713/158

(58) Field of Classification Search .............. 726/5
See application file for complete search history.

(56) References Cited

U.S. PATENT DOCUMENTS

| 6,009,177 A | * | 12/1999 | Sudia | 713/191 |
| 6,052,468 A | * | 4/2000 | Hillhouse | 380/281 |
| 2002/0010679 A1 | * | 1/2002 | Felsher | 705/51 |
| 2003/0018892 A1 | * | 1/2003 | Tello | 713/164 |

* cited by examiner

*Primary Examiner*—Longbit Chai
(74) *Attorney, Agent, or Firm*—Rabin & Berdo, P.C.

(57) ABSTRACT

A Secret file access authorization system with fingerprint limitation includes an authorization module, encryption module and certification module in a server linked by programs. A user module of least one client machine contains a kernel encryption/decryption unit embedded in the client operation system kernel, so access authorization to secure files can be limited by environment or time fingerprint. Therein the authorization module provides an authorization secret key (ASK) and fingerprint template. The encryption module accepts the ASK and secret files to be encrypted, and provides a decryption secret key (DSK). The user module accepts the ASK and encrypted secret files, and presents a claim for the ASK certification to the certification module. The certification module accepts the DSK and the claim and the template, and provides the certified DSK for the user module, to start the kernel encryption/decryption unit in the user module, and achieve reading and writing of encrypted files.

61 Claims, 4 Drawing Sheets

SECRET FILE ACCESS AUTHORIZATION SYSTEM WITH FINGERPRINT LIMITATION

FIELD OF THE INVENTION

The invention relates to a kind of information security technique. More particularly, it relates to a secret file access authorization system with environment limitation and time limitation.

BACKGROUND OF THE INVENTION

Figure 1:
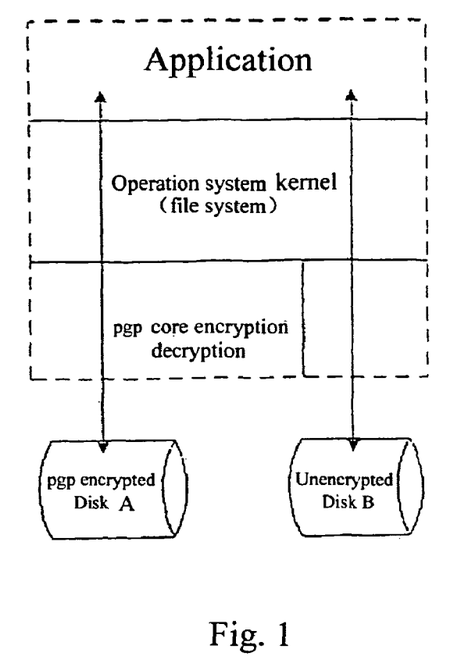
FIG. 1 is the schematic diagram of existing encryption protection of PGPDISK.

The existing secret file access authorization system does not have the secret file access authorization function with environment limitation and time limitation; take the file safe technique for example, an encrypted memory area is established in a computer to store secret files, and a user must have the authorization secret key to access the secret files in the encrypted memory area. However, the secret files can be accessed by anyone without the secret key when they are duplicated to other computers. As shown in FIG. 1, the files protected by PGPDISK can be copied to unencrypted Disk B which can be taken anywhere, thus losing authority control. It is very obvious that there is no environment limitation to PGPDISK encryption/decryption, i.e., even though the files which are taken are encrypted, they can also be accessed elsewhere so long as the PGPDISK software is installed.

Another existing technique is the secret file encryption technique. The encrypted secret files could be accessed only with the authorization secret key. However, if the secret files are transferred to an illegal environment (e.g., stolen to home or abroad), they can still be accessed if the authorization secret key is available. In other words, a kind of "position authorization" mechanism is needed for the authorization of secret files, i.e., only when the authorization object of the secret files is in a certain position or under a certain condition can he/she have the authority to access the secret files, and once his/her position changes or the authorization condition disappears, he/she should not have the authority to access to the secret files anymore. This can not be done according to the existing access authorization technique.

SUMMARY OF THE INVENTION

As stated above, the technical problem which the invention is to solve is how to overcome the defect that secret files are illegally stolen that is existing in the current secret file access authorization system; for this, one of the purposes of the invention is to limit the secret file access authorization to a particular environment. The particular environment can be a single desktop computer, a single notebook computer, a single palm computer, a calculation unit of intelligence electric appliances, a kind of equipment embedded with a calculation chip, and a certain scope of local area network, wide area network or internet and other numerical network systems that are composed of the above-mentioned computers, electric appliances or equipments. Through the technique provided by the invention, an administrator can designate the valid authorization environment, except for which the specified secret files cannot be accessed.

Another purpose of the invention is to limit the secret file access authorization to be within a certain period, which can be a time segment starting from the current time, e.g., several hours, several days, several weeks or several months. A certain period can also be an independent time segment not depending on the current time, e.g., from 8:00 AM to 5:30 PM on Friday, from January 1 to January 31 and so on. Through the technique provided by the invention, an administrator can designate the valid authorization time period, except for which the specified secret files cannot be accessed.

The fingerprint limitation can be realized by integration of the environment limitation with the time limitation determined by the above-mentioned purposes of the invention, and thus the general purpose of the invention is to provide a secret file access authorization system with fingerprint limitation.

The technical solution of the invention is as follows:

A secret file access authorization system with fingerprint limitation provided by the invention comprises:

An authorization server provided with an authorization module, which provides a fingerprint template and an authorization secret key;

an encryption server provided with an encryption module, which generates a decryption secret key after receives the authorization secret key provided by the authorization module, and produces the encrypted secret files by encrypting the secret files to be encrypted;

a certification server provided with a certification module, which accepts the fingerprint template provided by the authorization module and the decryption secret key provided by the encryption module, and the authorization secret key sent by the client machine to claim authorization, and judges and confirms providing the certified decryption secret key for the client machine;

and at least one client machine, each provided with a user module, which embeds the kernel encryption/decryption unit in the operation system kernel of the corresponding client, accepts the authorization secret key provided by the authorization module, sends the authorization secret key to the certification module to claim certification, opens the encryption/decryption unit with the certified decryption secret key returning from the certification module, and reads and writes the encrypted secret files.

The authorization server, the encryption server and the certification server can be merged into a system server, which is provided with the corresponding authorization module, encryption module and certification module; the authorization module provides the fingerprint template and the authorization secret key; the encryption module accepts the authorization secret key, encrypts the secret files to be encrypted to produce the encrypted secret files, and provides the decryption secret key; the certification module accepts the fingerprint template and the decryption secret key, and is coupled with the user module so as to accept the claim for an authorization secret key from the user module and, after making a judgment, return the certified authorization secret key and the certified decryption secret key to the user module.

The authorization server and the encryption server produces can be merged into an authorization-and-encryption server provided with an authorization module and an encryption module, and the authorization-and-encryption server provides authorization secret key, fingerprint template and decryption secret key, encrypts the secret files to be encrypted to produce the encrypted secret files, and is coupled respectively with the certification module of the certification server and the user module of the client.

The authorization server and the certification server can be merged into an authorization-and-certification server provided with an authorization module and a certification module, which provides the authorization secret key for the encryption module in the encryption server and the user module in the client machine, accepts a claim from the user module of the client machine for the certification of the authorization secret key it has accepted, and returns the certified authorization secret key and the certified decryption secret key at the same time.

The encryption server and the certification server can be merged into an encryption-and-certification server, which is provided with an encryption module and a certification module; the encryption module accepts the authorization secret key provided by the authorization server and encrypts the secret files to be encrypted to produce the encrypted secret files, and provides the decryption secret key and sends it to the certification module, which provides the certified decryption secret key for the user module of the client machine to allow the client to read/write the encrypted secret files.

Further, the authorization module includes a password fingerprint unit, an environment fingerprint sampling unit, and a time fingerprint sampling unit set in parallel, as well as an authorization unit coupled behind them, with the authorization unit providing the authorization secret key and the said three units set in parallel providing the fingerprint template together. The fingerprint template is a binary string of a certain length, which contains password and environment fingerprint information, or password and time fingerprint information, or password, environment fingerprint and time fingerprint information. The authorization secret key is a binary string of a certain length, and can be put into an authorized entity.

The encryption module includes a secret key generation unit and an encryption unit linked in sequence by the programs; the secret key generation unit provides a decryption secret key after accepting the authorization secret key provided by the authorization module; the encryption unit accepts the input of secret files to be encrypted, and produces the encrypted secret files by using the decryption secret key provided by the secret key generation unit, or produces the encrypted secret files by using the authorization secret key to encrypt the secret files to be encrypted, or produces the encrypted secret files by using the decryption secret key and the authorization secret key.

The certification module includes the following: the environment fingerprint certification unit, the password fingerprint certification unit, and the time fingerprint certification unit which are set in parallel to accept the fingerprint template provided by the authorization module; the certification interface unit linked with them by the bidirectional programs, the certification interface unit also accepts the decryption secret key provided by the encryption module and the authorization secret key claiming certification from the user module respectively, and provides the certified decryption secret key for the user module.

The user module of the client machine includes the following: the application unit, the kernel encryption/decryption unit, and the input/output unit, which are linked by the bidirectional programs in sequence; the authorization input unit, which accepts the authorization secret key and sends it to the kernel encryption/decryption unit; the kernel encryption/decryption unit provides the authorization secret key claiming certification for the certification module, and accepts the certified decryption secret key sent by the certification module; the input/output unit is linked bidirectionally to the encrypted secret files; the kernel encryption/decryption unit is embedded in the operation system kernel (operation file) of the client machine. More specifically, the client operation system can be Microsoft Windows 95/98/ME/NT/2000/XP/2003 Server, Linux/Unix, Pocket, Symbian OS, Windows CE embedded operation system, Mac OS, Sun OS, Novell netware, or other server or network operation system. The programs of the application unit can be Microsoft Office and its components, other desktop applications, or embedded applications.

As stated above, the information security level of the invention is enhanced essentially compared to the existing technique, and its authorization of access to the secret files is limited by environment and time.

BRIEF DESCRIPTIONS OF THE DRAWING

FIG. 5 is the schematic diagram of certification module architecture of the invention.

DETAILED DESCRIPTION OF THE PREFERRED EMBODIMENT

A preferred embodiment of the invention is given in the following according to FIG. 2-7, and described in detail; the technical details of the invention are further provided in combination with the elaboration of the example, so that a better understanding of the technical and functional characteristics of the invention would be obtained; all these are used to explain the invention, but not to confine the protection scope of the invention.

Figure 2:
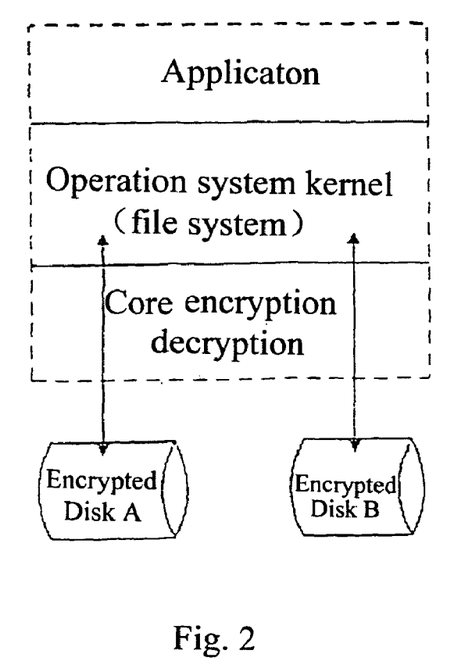
FIG. 2 is the schematic diagram of environment encryption protection of the invention.

FIG. 2 shows the technical conception of the invention, i.e., encryptically protect all of the I/O channels (all of the secret file carriers, e.g., disks, CDs, network, files, web pages), so that no unencrypted files can not be taken; the encryption/decryption has to be certified in a designated environment (environment fingerprint), therefore, even the encrypted files are taken, because a legal environment fingerprint cannot be achieved in another place (environment), the environment certification cannot be obtained, and thus the stealer still cannot open and use the encrypted files.

Figure 3:
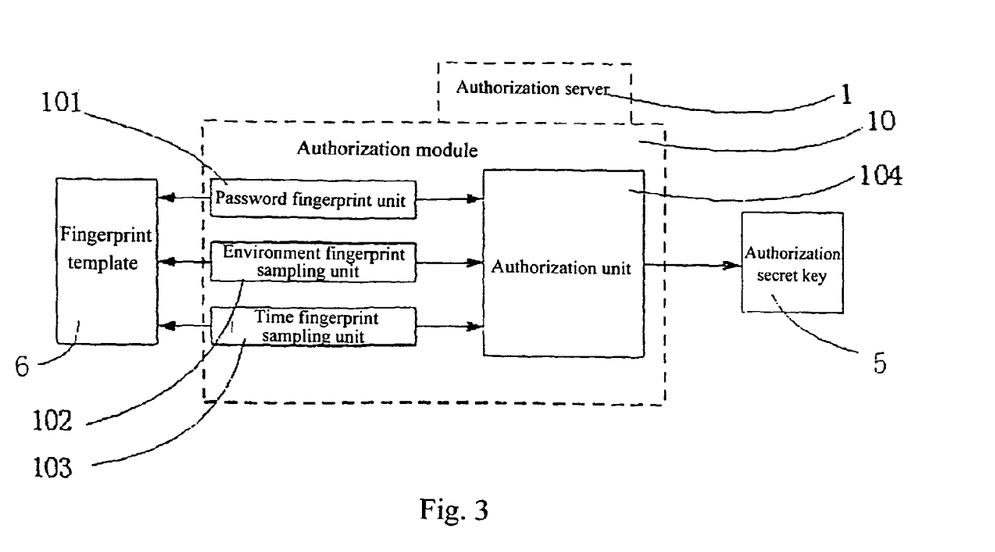
FIG. 3 is the schematic diagram of authorization module architecture of the invention.

The typical embodiment is provided according to the technical conception shown in FIG. 2:

The system of the invention shown in FIG. 3 is provided with an authorization server 1 that is provided with an authorization module 10; the authorization module 10 is provided with a password fingerprint unit 101, an environment fingerprint sampling unit 102 and a time fingerprint sampling unit 103, which are set in parallel, as well as an authorization unit 104 coupled behind them. According to the designated password, the password fingerprint unit 101 generates a unique and unduplicable data to be used as the password fingerprint. The environment fingerprint sampling unit 102 collects a unique and unduplicable data from the designated environment to be used as the fingerprint of the environment. The said unique and unduplicable data can be the MAC address of the network card, and the serial number of the hard drive. According to the current time and the time limitation designated by the administrator, the time fingerprint sampling unit 103 generates a unique and unduplicable data to be used as the time fingerprint. The authorization unit 104 generates the unique and unduplicable authorization secret key 5 according to the password fingerprint generated by the password fingerprint unit 101, the environment fingerprint collected by the environment fingerprint sampling unit 102, or the time fingerprint generated by the time fingerprint unit 103. The unique and unduplicable authorization secret key 5 is a binary string of a certain length. It can be put into a specific authorization entity. The authorization entity can take the form of password, electronic secret key, numerical certificate, dongle and other hardware or software that has the function against illegal duplication. Besides, the password fingerprint generated by the password fingerprint unit 101, the environment fingerprint collected by the environment fingerprint sampling unit 102, and the time fingerprint generated by the time fingerprint unit 103, can be merged into a fingerprint template 6. In the certification module that will be discussed later, the fingerprint template is compared with the fingerprint to be certified, and the certification outcome is determined by the comparison results. The fingerprint template 6 is a binary string of a certain length.

Figure 4:
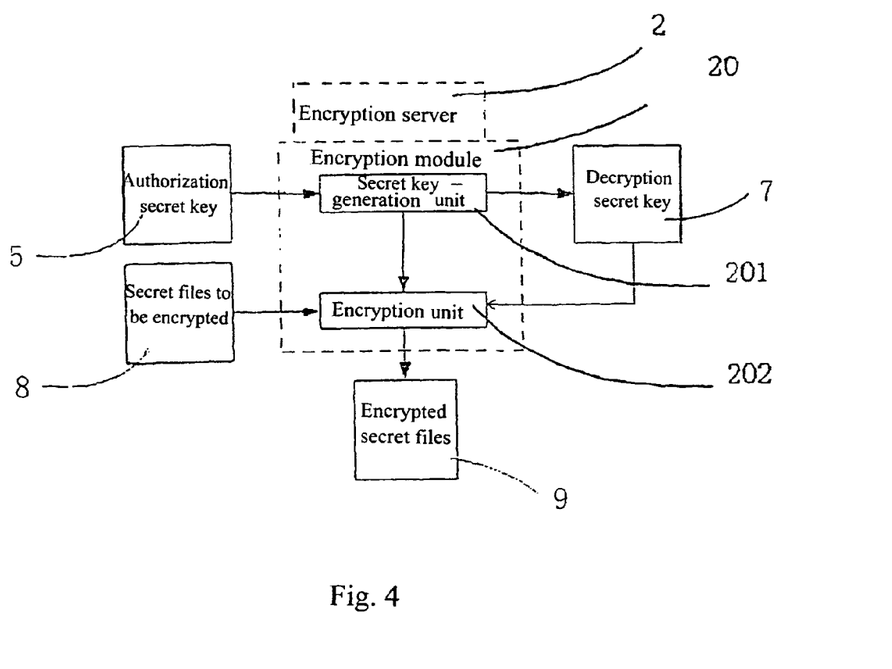
FIG. 4 is the schematic diagram of encryption module architecture of the invention.

As shown in FIG. 4, the system of the invention is provided with an encryption server 2 which is provided with an encryption module 20, the encryption module 20 is provided with a secret key generation unit 201 and an encryption unit 202 that are linked by the programs in sequence. The secret key generation unit 201 generates the decryption secret key 7 by using the authorization secret key 5 provided by the authorization module 10. The encryption unit 202 executes the encryption process upon the secret file to be encrypted 8 by using the authorization secret keys 5 and the decryption secret key 7, or only one of them, and produces the encrypted secret file 9. The encryption process can adopt either the public secret key method or the private secret key method. The encrypted secret file 9 can be released publicly.

As shown in FIG. 5, the system of the invention is provided with a certification server 3 that is provided with a certification module 30. The certification module 30 is provided with an environment fingerprint certification unit 301, a password fingerprint certification unit 302 and a time fingerprint certification unit 303, which are set in parallel, as well as a certification interface unit 304 that is linked with them by the bidirectional programs. The environment fingerprint certification unit 301, the password fingerprint certification unit 302, and the time fingerprint certification unit 303 respectively obtain the environment fingerprint template, the password fingerprint template and the time fingerprint template from the fingerprint template 6 provided by the authorization module 10. Moreover, the environment fingerprint certification unit 301, the password fingerprint certification unit 302, and the time fingerprint certification unit 303 obtain the environment fingerprint, the password fingerprint and the time fingerprint to be certified respectively from the certification secret key sent for certification 5' by client machine 4 which is to be described in the following FIG. 6 through the certification interface unit 304. The certification process is that the environment fingerprint certification unit 301 compares the environment fingerprint template with the environment fingerprint to be certified, and the comparison result is returned to the certification interface unit 304. The password fingerprint certification unit 302 compares the password fingerprint template with the password fingerprint to be certified, and the comparison result is returned to the certification interface unit 304. The time fingerprint certification unit 303 is compares the time fingerprint template with the time fingerprint to be certified, and the comparison result is returned to the certification interface unit 304. The certification interface unit 304 will make a judgment according to the three comparison results; if all of the three results are the same, the certification succeeds, otherwise it fails. Only with a successful certification will the certification interface unit 304 sends the certified decryption secret key 7' generated by the decryption secret key 7 which is provided by the encryption module 20 to the claiming certification user module 40, and the user module 40 decrypt the encrypted secret file 9 using the certification decryption secret key 7' (refer to FIG. 6).

Figure 6:
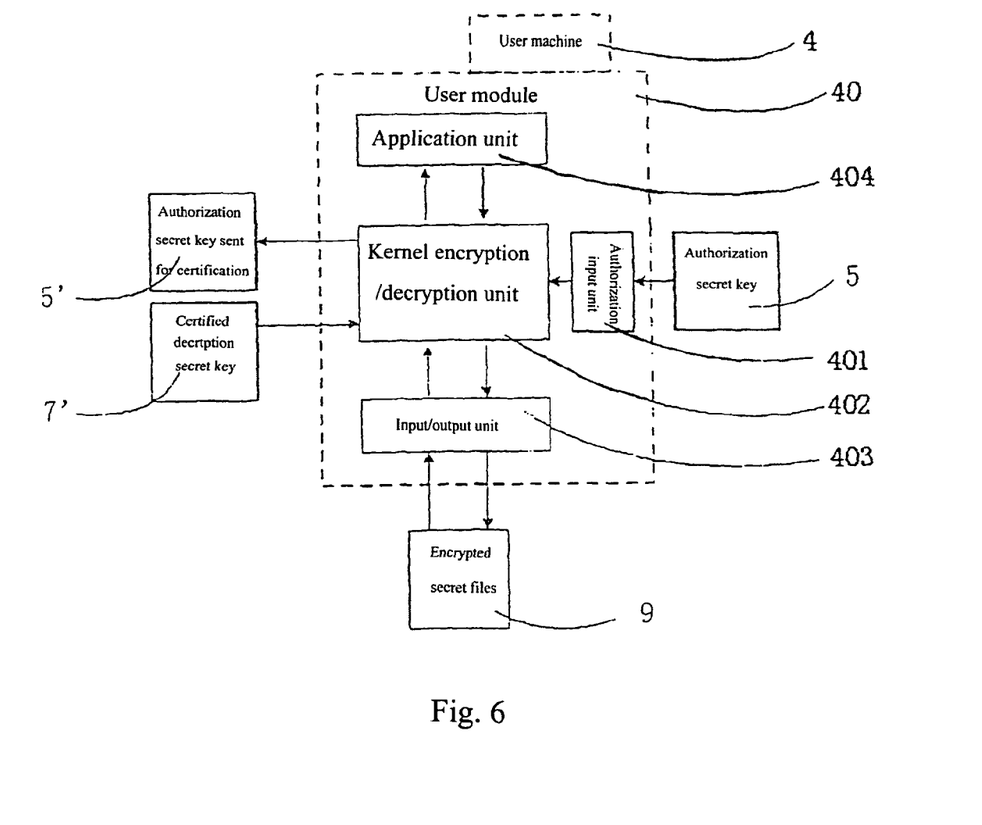
FIG. 6 is the schematic diagram of user module architecture of the invention.
Figure 7:
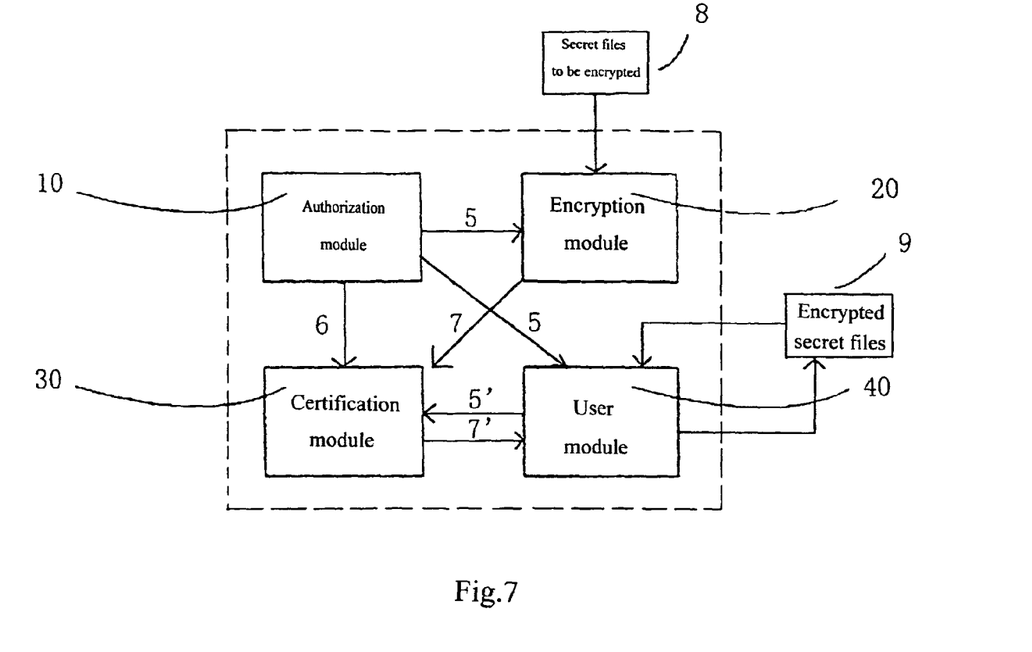
FIG. 7 is the schematic diagram of system architecture of the invention.

As shown in FIG. 6, the system of the invention is provided with at least one Client machine 4, each provided with a user module 40. The user module 40 is provided with an authorization input unit 401 and a kernel encryption/decryption unit 402, which are linked by the programs in sequence; the kernel encryption/decryption unit 402 is linked respectively with an input/output unit 403 bidirectionally, and with an application unit 404 by the bidirectional programs. The authorization input unit 401 accepts the authorization entity which is inputted by the user, takes the authorization secret key 5 out of the authorization entity, and delivers it to the kernel encryption/decryption unit 402. The kernel encryption/decryption unit 402 is coupled with the certification interface unit 304 of the certification module 30, and presents the authorization secret key 5 for certification. If the certification is passed, the certified decryption secret key 7', which is necessary for decryption, can be obtained from the certification interface unit 304 of the certification module 30. The kernel encryption/decryption unit 402 is embedded seamlessly into the operation system kernel and the application kernel, and thus can encrypt/decrypt all of the encrypted secret file 9 read or written by using the authorization secret key 5 and the certified decryption secret key 7'. If the authorization is invalid, the certification is determined to fail, and thus the kernel encryption/decryption unit 402 cannot obtain the certified decryption secret key 7', thus cannot decrypt the encrypted secret file 9, and thus cannot make it accessible. The operation system can be Microsoft Windows 95/98/ME/NT/2000/XP/2003 Server. The operation system can be Linux/Unix operation system; the operation system can be such an embedded operation system as Pocket, Symbian OS and Windows CE; the operation system can be Mac OS; the operation system can be Sun OS, Novell netware and other server or network operation systems. The application can be Microsoft Office and its components; the application can be other desktop applications or embedded applications.

As stated above, the components of the system in this embodiment include the following: an authorization server 1 provided with the authorization module 10; an encryption server 2 provided with the encryption module 20; a certification server 3 provided with the certification module 30; and at least one client machine 4, each provided with the user module 40; the connection relationship between the authorization module 10, the encryption module 20, the certification module 30 and the user module 40 is shown in FIG. 5, and the authorization module 10 provides the fingerprint template 6 to the certification module 30; the authorization fingerprint 5 that is provided is sent to the encryption module 20 and the user module 40 respectively; the encryption module 20 encrypts the secret file to be encrypted 8 and produces the encrypted secret file 9, and provides the decryption secret key 7 for the certification module 30; the certification module 30 accepts the fingerprint template 6, the decryption secret key 7, and the authorization fingerprint 5' claiming certification sent from the user module 40, and, after the authorization fingerprint 5' is checked, returns the certified decryption secret key 7' to the user module 40; after obtaining the certified decryption secret key 7' from the certification module 30, the user module 40 drives the kernel encryption/decryption unit 402 in the operation system kernel (file system) of client machine 4, and thus allows reading and writing of the encrypted secret file 9.

As an alteration to the embodiment, the authorization server 1, the encryption server 2 and the certification server 3 can be merged and replaced by a system server; the engineering server of the system can be provided with the authorization module 10, the encryption module 20 and the certification module 30, with their internal setting and mutual connection being still the same as what is mentioned in the above embodiment.

Certainly, the encryption server 2 and the authorization server 1 can also be merged, and provided respectively with the corresponding encryption module 20 and authorization module 10, while the certification server 3 is independent and provided with the certification module 30.

The invention claimed is:

1. A secret file access authorization system with fingerprint limitation, comprising:
   an authorization server provided with an authorization module, which provides a fingerprint template and an authorization secret key, the authorization module including a password fingerprint unit, an environment fingerprint sampling unit, and a time fingerprint sampling unit, which are set in parallel, as well as an authorization unit, wherein the environment fingerprint can only be certified for a designated hardware environment;
   an encryption server provided with an encryption module, which generates a decryption secret key by accepting the authorization secret key provided by the authorization module, and produces encrypted secret files by encrypting secret files to be encrypted;
   a certification server provided with a certification module, which accepts the fingerprint template provided by the authorization module, accepts the decryption secret key provided by the encryption module and the authorization secret key claiming certification that is sent by a client, and judges and confirms by providing a certified decryption secret key; and
   at least one client machine, each of which is provided with a user module, which embeds a kernel encryption/decryption unit into a corresponding operation system kernel of the client, accepts the authorization secret key provided by the authorization module and the decryption secret key provided by the encryption module, sends the claiming of certification respectively to the certification module, opens the encryption/decryption unit with a certified authorization secret key and the certified decryption secret key which is returned after the certification module makes the certification, and reads/writes the encrypted secret files.

2. A secret file access authorization system with fingerprint limitation according to claim 1, wherein the authorization server, the encryption server, and the certification server are merged to constitute a system server, which is provided with the authorization module, the encryption module, and the certification module.

3. A secret file access authorization system with fingerprint limitation according to claim 2, wherein the authorization module includes the password fingerprint unit, the environment fingerprint sampling unit, the time fingerprint sampling unit, and the authorization unit; wherein the password fingerprint unit, the environment fingerprint sampling unit, and the time fingerprint sampling unit are set in parallel respectively by bidirectional programs; wherein the authorization unit provides the authorization secret key, while the password fingerprint unit, the environment fingerprint sampling unit, and the time fingerprint sampling unit provide the fingerprint template.

4. A secret file access authorization system with fingerprint limitation according to claim 3, wherein the authorization secret key is a binary string of a certain length.

5. A secret file access authorization system with fingerprint limitation according to claim 4, wherein the authorization secret key is put into an authorized entity.

6. A secret file access authorization system with fingerprint limitation according to claim 3, wherein the fingerprint template is a binary string of a certain length.

7. A secret file access authorization system with fingerprint limitation according to claim 2, wherein the encryption module includes a secret key generation unit and an encryption unit, which are linked in sequence by programs; wherein the secret key generation unit provides the decryption secret key after accepting the authorization secret key provided by the authorization module; and wherein the encryption unit accepts the input of secret files to be encrypted, and produces the encrypted secret files by using the decryption secret key provided by the secret key generation unit.

8. A secret file access authorization system with fingerprint limitation according to claim 7, wherein the encryption unit accepts the input of the secret files to be encrypted, and produces the encrypted secret files by using the authorization secret key.

9. A secret file access authorization system with fingerprint limitation according to claim 7, wherein the encryption unit accepts the input of the secret files to be encrypted, and produces the encrypted secret files by using the decryption secret key and the authorization secret key at the same time.

10. A secret file access authorization system with fingerprint limitation according to claim 2, wherein the certification module includes an environment fingerprint certification unit, a password fingerprint certification unit, and a time fingerprint certification unit set in parallel by accepting the fingerprint template provided by the authorization module; and wherein a certification interface unit is linked with them by bidirectional programs, which also accepts the decryption secret key provided by the encryption module and the certification secret key from the user module claiming certification respectively, and provides the certified decryption secret key for the user module.

11. A secret file access authorization system with fingerprint limitation according to claim 2, wherein the user module includes an application unit, the kernel encryption/decryption unit, and an input/output unit, which are linked in sequence by bidirectional programs, and an authorization input unit, which accepts the authorization secret key and sends it into the kernel encryption/decryption unit; wherein the kernel encryption/decryption unit provides the authorization secret key claiming certification for the certification module, and accepts the certified decryption secret key sent by the certification module; wherein an input/output unit is coupled with the encrypted secret files bidirectionally; and wherein the kernel encryption/decryption unit is embedded in the operation system kernel.

12. A secret file access authorization system with fingerprint limitation according to claim 11, wherein the operation system is Microsoft Windows 95/98/MENT/2000/XP/2003 Server or Linux/Unix or Pocket, Symbian OS, Windows CE embedded operation system or Mac OS or Sun OS, Novell netware and other server or network operation systems.

13. A secret file access authorization system with fingerprint limitation according to claim 11, wherein a program used by the application unit is Microsoft Office and its components or other desktop applications or embedded applications.

14. A secret file access authorization system with fingerprint limitation according to claim 1, wherein the authorization server and the encryption server are merged to constitute an authorization-and-encryption server, which is provided with the authorization module and the encryption module.

15. A secret file access authorization system with fingerprint limitation according to claim 14, wherein the authorization module includes the password fingerprint unit, the environment fingerprint sampling unit, the time fingerprint sampling unit, and the authorization unit; wherein the password fingerprint unit, the environment fingerprint sampling unit, and the time fingerprint sampling unit are set in parallel respectively by bidirectional programs; wherein the authorization unit provides the authorization secret key, while the password fingerprint unit, the environment fingerprint sampling unit, and the time fingerprint sampling unit that are set in parallel provide the fingerprint template.

16. A secret file access authorization system with fingerprint limitation according to claim 15, wherein the authorization secret key is a binary string of a certain length.

17. A secret file access authorization system with fingerprint limitation according to claim 16, wherein the authorization secret key is put into an authorized entity.

18. A secret file access authorization system with fingerprint limitation according to claim 15, wherein the fingerprint template is a binary string of a certain length.

19. A secret file access authorization system with fingerprint limitation according to claim 14, wherein the encryption module includes a secret key generation unit and an encryption unit, which are linked in sequence by programs; wherein the secret key generation unit provides the decryption secret key after accepting the authorization secret key provided by the authorization module; and wherein the encryption unit accepts the input of secret files to be encrypted, and produces the encrypted secret files by using the decryption secret key provided by the secret key generation unit.

20. A secret file access authorization system with fingerprint limitation according to claim 19, wherein the encryption unit accepts the input of the secret files to be encrypted, and produces the encrypted secret files by using the authorization secret key.

21. A secret file access authorization system with fingerprint limitation according to claim 19, wherein the encryption unit accepts the input of the secret files to be encrypted, and produces the encrypted secret files by using the decryption secret key and the authorization secret key at the same time.

22. A secret file access authorization system with fingerprint limitation according to claim 14, wherein the certification module includes an environment fingerprint certification unit, a password fingerprint certification unit, and a time fingerprint certification unit set in parallel by accepting the fingerprint template provided by the authorization module; and wherein a certification interface unit is linked with them by bidirectional programs, which also accepts the decryption secret key provided by the encryption module and the certification secret key from the user module claiming certification respectively, and provides the certified decryption secret key for the user module.

23. A secret file access authorization system with fingerprint limitation according to claim 14, wherein the user module includes an application unit, the kernel encryption/decryption unit, and an input/output unit, which are linked in sequence by bidirectional programs, and an authorization input unit, which accepts the authorization secret key and sends it into the kernel encryption/decryption unit; wherein the kernel encryption/decryption unit provides the authorization secret key claiming certification for the certification module, and accepts the certified decryption secret key sent by the certification module; and the input/output unit is coupled with the encrypted secret files bidirectionally; and wherein the kernel encryption/decryption unit is embedded in the operation system kernel.

24. A secret file access authorization system with fingerprint limitation according to claim 23, wherein the operation system is Microsoft Windows 95/98/ME/NT/2000/XP/2003 Server or Linux/Unix or Pocket, Symbian OS, Windows CE embedded operation system or Mac OS or Sun OS, Novell netware and other server or network operation systems.

25. A secret file access authorization system with fingerprint limitation according to claim 23, wherein a program used by the application unit is Microsoft Office and its components or other desktop applications or embedded applications.

26. A secret file access authorization system with fingerprint limitation according to claim 1, wherein the authorization server and the certification server are merged to constitute an authorization-and-certification server, which is provided with the authorization module and the certification module.

27. A secret file access authorization system with fingerprint limitation according to claim 26, wherein the authorization module includes the password fingerprint unit, the environment fingerprint sampling unit, the time fingerprint sampling unit, and the authorization unit; wherein the password fingerprint unit, the environment fingerprint sampling unit, and the time fingerprint sampling unit are set in parallel respectively by bidirectional programs; wherein the authorization unit provides the authorization secret key, while the password fingerprint unit, the environment fingerprint sampling unit, and the time fingerprint sampling unit provide the fingerprint template.

28. A secret file access authorization system with fingerprint limitation according to claim 27, wherein the authorization secret key is a binary string of a certain length.

29. A secret file access authorization system with fingerprint limitation according to claim 28, wherein the authorization secret key is put into an authorized entity.

30. A secret file access authorization system with fingerprint limitation according to claim 27, wherein the fingerprint template is a binary string of a certain length.

31. A secret file access authorization system with fingerprint limitation according to claim 26, wherein the encryption module includes a secret key generation unit and an encryption unit, which are linked in sequence by programs; wherein the secret key generation unit provides the decryption secret key after accepting the authorization secret key provided by the authorization module; and wherein the encryption unit accepts the input of secret files to be encrypted, and produces the encrypted secret files by using the decryption secret key provided by the secret key generation unit.

32. A secret file access authorization system with fingerprint limitation according to claim 31, wherein the encryption unit accepts the input of the secret files to be encrypted, and produces the encrypted secret files by using the authorization secret key.

33. A secret file access authorization system with fingerprint limitation according to claim 31, wherein the encryption unit accepts the input of the secret files to be encrypted, and produces the encrypted secret files by using the decryption secret key and the authorization secret key at the same time.

34. A secret file access authorization system with fingerprint limitation according to claim 26, wherein the certification module includes an environment fingerprint certification unit, a password fingerprint certification unit, and a time fingerprint certification unit set in parallel by accepting the fingerprint template provided by the authorization module; and wherein a certification interface unit is linked with them by bidirectional programs, which also accepts the decryption secret key provided by the encryption module and the certification secret key from the user module claiming certification respectively, and provides the certified decryption secret key for the user module.

35. A secret file access authorization system with fingerprint limitation according to claim 26, wherein the user module includes an application unit, the kernel encryption/decryption unit, and an input/output unit, which are linked in sequence by bidirectional programs, and an authorization input unit, which accepts the authorization secret key and sends it into the kernel encryption/decryption unit; wherein the kernel encryption/decryption unit provides the authorization secret key claiming certification for the certification module, and accepts the certified decryption secret key sent by the certification module; wherein the input/output unit is coupled with the encrypted secret files bidirectionally; and wherein the kernel encryption/decryption unit is embedded in the operation system kernel.

36. A secret file access authorization system with fingerprint limitation according to claim 35, wherein the operation system is Microsoft Windows 95/98/ME/NT/2000/XP/2003 Server or Linux/Unix or Pocket, Symbian OS, Windows CE embedded operation system or Mac OS or Sun OS, Novell netware and other server or network operation systems.

37. A secret file access authorization system with fingerprint limitation according to claim 35, wherein a program used by the application unit is Microsoft Office and its components or other desktop applications or embedded applications.

38. A secret file access authorization system with fingerprint limitation according to claim 1, wherein the encryption server and the certification server are merged to constitute an encryption-and-certification server, which is provided with the encryption module and the certification module.

39. A secret file access authorization system with fingerprint limitation according to claim 38, wherein the authorization module includes the password fingerprint unit, the environment fingerprint sampling unit, the time fingerprint sampling unit, and the authorization unit; wherein the password fingerprint unit, the environment fingerprint sampling unit, and the time fingerprint sampling unit are set in parallel respectively by bidirectional programs; wherein the authorization unit provides the authorization secret key, while the password fingerprint unit, the environment fingerprint sampling unit, and the time fingerprint sampling unit that are set in parallel provide the fingerprint template.

40. A secret file access authorization system with fingerprint limitation according to claim 39, wherein the authorization secret key is a binary string of a certain length.

41. A secret file access authorization system with fingerprint limitation according to claim 40, wherein the authorization secret key is put into an authorized entity.

42. A secret file access authorization system with fingerprint limitation according to claim 39, wherein the fingerprint template is a binary string of a certain length.

43. A secret file access authorization system with fingerprint limitation according to claim 38, wherein the encryption module includes a secret key generation unit and an encryption unit, which are linked in sequence by programs; wherein the secret key generation unit provides the decryption secret key after accepting the authorization secret key provided by the authorization module; and wherein the encryption unit accepts the input of secret files to be encrypted, and produces the encrypted secret files by using the decryption secret key provided by the secret key generation unit.

44. A secret file access authorization system with fingerprint limitation according to claim 43, wherein the encryption unit accepts the input of the secret files to be encrypted, and produces the encrypted secret files by using the authorization secret key.

45. A secret file access authorization system with fingerprint limitation according to claim 43, wherein the encryption unit accepts the input of the secret files to be encrypted, and produces the encrypted secret files by using the decryption secret key and the authorization secret key at the same time.

46. A secret file access authorization system with fingerprint limitation according to claim 38, wherein the certification module includes an environment fingerprint certification unit, a password fingerprint certification unit, and a time fingerprint certification unit set in parallel by accepting the fingerprint template provided by the authorization module; and wherein a certification interface unit linked with them by the bidirectional programs, which also accepts the decryption secret key provided by the encryption module and the certification secret key from the user module claiming certification respectively, and provides the certified decryption secret key for the user module.

47. A secret file access authorization system with fingerprint limitation according to claim 38, wherein the user module includes an application unit, the kernel encryption/decryption unit, and an input/output unit, which are linked in sequence by bidirectional programs, and an authorization input unit, which accepts the authorization secret key and sends it into the kernel encryption/decryption unit; wherein the kernel encryption/decryption unit provides the authorization secret key claiming certification for the certification module, and accepts the certified decryption secret key sent by the certification module; wherein the input/output unit is coupled with the encrypted secret files bidirectionally; and wherein the kernel encryption/decryption unit is embedded in the operation system kernel.

48. A secret file access authorization system with fingerprint limitation according to claim 47, wherein the operation system is Microsoft Windows 95/98/ME/NT/2000/XP/2003 Server or Linux/Unix or Pocket, Symbian OS, Windows CE embedded operation system or Mac OS or Sun OS, Novell netware and other server or network operation systems.

49. A secret file access authorization system with fingerprint limitation according to claim 47, wherein a program used by the application unit is Microsoft Office and its components or other desktop applications or embedded applications.

50. A secret file access authorization system with fingerprint limitation according to claim 1, wherein the password fingerprint unit, the environment fingerprint sampling unit, and the time fingerprint sampling unit are set in parallel respectively by bidirectional programs; and wherein the authorization unit provides the authorization secret key, while the password fingerprint unit, the environment fingerprint sampling unit, and the time fingerprint sampling unit that are set in parallel provide the fingerprint template.

51. A secret file access authorization system with fingerprint limitation according to claim 50, wherein the authorization secret key is a binary string of a certain length.

52. A secret file access authorization system with fingerprint limitation according to claim 51, wherein the authorization secret key is put into an authorized entity.

53. A secret file access authorization system with fingerprint limitation according to claim 50, wherein the fingerprint template is a binary string of a certain length.

54. A secret file access authorization system with fingerprint limitation according to claim 1, wherein the encryption module includes a secret key generation unit and an encryption unit, which are linked in sequence by programs; wherein the secret key generation unit provides the decryption secret key after accepting the authorization secret key provided by the authorization module; and wherein the encryption unit accepts the input of secret files to be encrypted, and produces the encrypted secret files by using the decryption secret key provided by the secret key generation unit.

55. A secret file access authorization system with fingerprint limitation according to claim 54, wherein the encryption unit accepts the input of the secret files to be encrypted, and produces the encrypted secret files by using the authorization secret key.

56. A secret file access authorization system with fingerprint limitation according to claim 54, wherein the encryption unit accepts the input of the secret files to be encrypted, and produces the encrypted secret files by using the decryption secret key and the authorization secret key at the same time.

57. A secret file access authorization system with fingerprint limitation according to claim 1, wherein the certification module includes an environment fingerprint certification unit, a password fingerprint certification unit, and a time fingerprint certification unit set in parallel by accepting the fingerprint template provided by the authorization module; wherein a certification interface unit is linked with them by bidirectional programs, and also accepts the decryption secret key provided by the encryption module and a certification secret key from the user module claiming certification respectively, and provides the certified decryption secret key for the user module.

58. A secret file access authorization system with fingerprint limitation according to claim 1, wherein the user module includes an application unit, a kernel encryption/decryption unit and an input/output unit, which are linked in sequence by bidirectional programs, as well as an authorization input unit, which accepts the authorization secret key and sends it into the kernel encryption/decryption unit; wherein the kernel encryption/decryption unit provides the authorization secret key claiming certification for a certification module, and accepts a certified decryption secret key sent by the certification module; wherein the input/output unit is coupled with the encrypted secret files bidirectionally; wherein the kernel encryption/decryption unit is embedded in the operation system kernel.

59. A secret file access authorization system with fingerprint limitation according to claim 58, wherein the operation system is Microsoft Windows 95/98/ME/NT/2000/XP/2003 Server or Linux/Unix or Pocket, Symbian OS, Windows CE embedded operation system or Mac OS or Sun OS, Novell netware and other server or network operation systems.

60. A secret file access authorization system with fingerprint limitation according to claim 58, wherein a program used by the application unit is Microsoft Office and its components or other desktop applications or embedded applications.

61. A secret file access authorization system with fingerprint limitation according to claim 1, wherein the environment fingerprint sampling unit determines whether a request for decryption of one of the encrypted secret files originated from a client machine that is authorized to decrypt said one of the encrypted secret files, and wherein the time signature sampling unit determines whether said request for decryption has occurred during a limited time window set for authorized decryption.

* * * * *